April 14, 1931. J. C. KARNES 1,801,009
ELEVATION INDICATING DEVICE FOR ORDNANCE OF THE HOWITZER TYPE
Filed Oct. 13, 1926
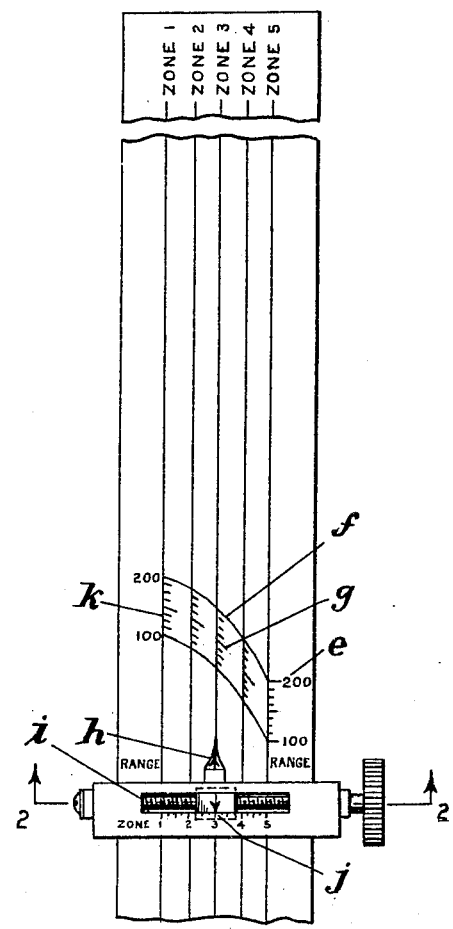
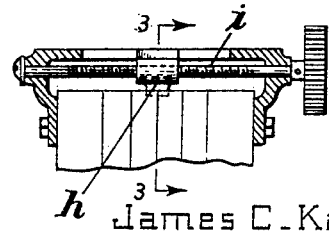
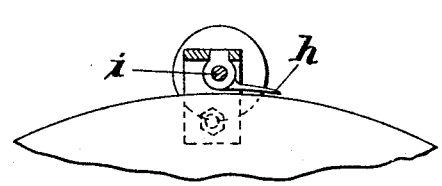
Inventor
James C. Karnes
By W. N. Roach.
Attorney Patented Apr. 14, 1931

1,801,009

UNITED STATES PATENT OFFICE

JAMES C. KARNES, OF BUFFALO, NEW YORK

ELEVATION-INDICATING DEVICE FOR ORDNANCE OF THE HOWITZER TYPE

Application filed October 13, 1926. Serial No. 141,400.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to an elevation indicating device for ordnance of the howitzer type.

In connection with the laying of artillery employing separate loading ammunition the weight of the propelling charge provides the muzzle velocity for the different zones of fire and forms the basis for the range scales and tables. As some lots of powder vary from normal, it becomes necessary to correct for intermediate muzzle velocities or powder charges and the present practice consists in estimating or calculating the correction from the range table.

The principal object of this invention is to provide means whereby the correction may be directly applied to the range scale and when once set will hold for all ranges in that zone. The arrangement embodying this feature also enables the range scale to be made more compact.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of my invention is illustrated in the accompanying drawings, in which Fig. 1 is a view in elevation of a range strip showing the arrangement of the range scales formed according to the present invention;

Fig. 2 is a sectional view on the line 2—2 of Fig. 1;

Fig. 3 is a sectional view on the line 3—3 of Fig. 2.

Referring to the drawings by numerals of reference:

In the improved strip shown in Fig. 1 the range numerals $e$ are provided one at each side thereby enabling the strip to be narrow and a plotted curve $f$ connects the corresponding ranges of all five zones. These full line curves are preferably placed at intervals of 100 yards and intermediate points may be indicated by the broken lines $g$.

The scales are to be read against a pointer $h$ which is mounted on a lead screw $i$ and movable thereby to a position in line with the designated zones or to intermediate positions along the scale $j$ to allow for application of corrections to muzzle velocity. The lines $k$ of the scales are preferably inclined to facilitate establishment of imaginary curves for intermediate ranges at intermediate zones.

If the range strip is placed on a drum which is movable with the carriage, the operation would consist in elevating the carriage until the proper visible or imaginary curve is beneath the tip of the pointer.

Where the strip is placed on the arcuate shank of a panoramic sight, the sight is depressed until the curve representing the desired range reading is under the pointer.

I claim:

1. An elevation indicating device for guns employing separate loading ammunition embodying a set of parallel range scales corresponding to different zones of fire, range designating numerals on each side of the set, a plotted curve connecting the corresponding ranges of all zones, a fixed correction scale extending transversely of the range scales, a pointer against which the range and correction scales are read and means for moving the pointer across the sets of scales.

2. A range strip including a set of range scales corresponding to different zones of fire based on powder charge, said strip having a plotted curve connecting the corresponding ranges of all zones, a pointer against which the scales may be read and means for indicating a predetermined displacement of the pointer from a prescribed zone.

3. A range strip including a set of range scales corresponding to different zones of fire based on powder charge, a plotted curve connecting corresponding ranges of all zones, a pointer movable across the range scales, and a scale of muzzle velocity corrections against which the pointer is read, said scale indicating intermediate zones and applicable for all ranges.

JAMES C. KARNES.